Oct. 28, 1969   R. S. LEVIN ET AL   3,474,691
UNIVERSAL ANGULAR INDEXING TABLE
Filed Jan. 29, 1968   2 Sheets-Sheet 1
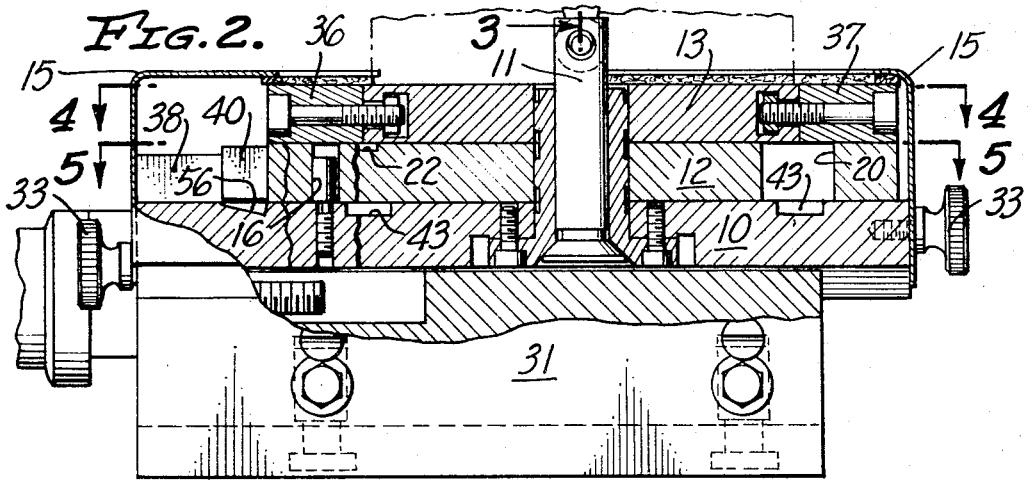
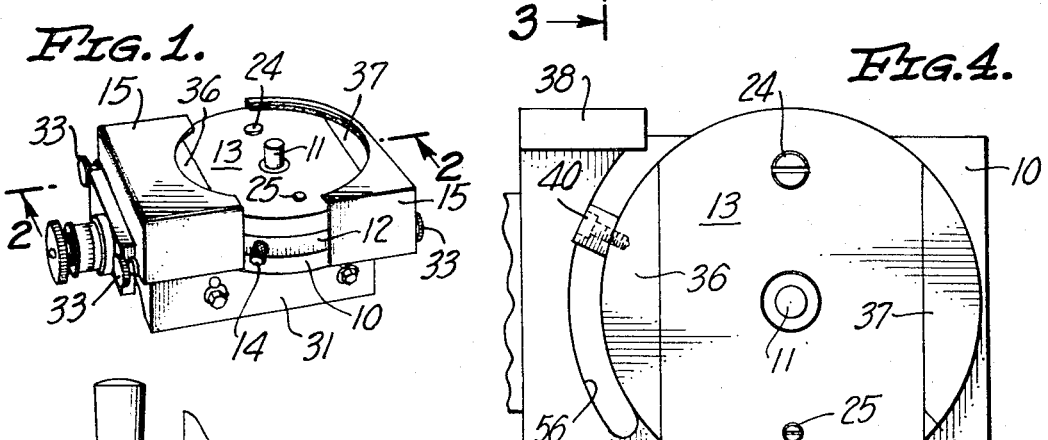
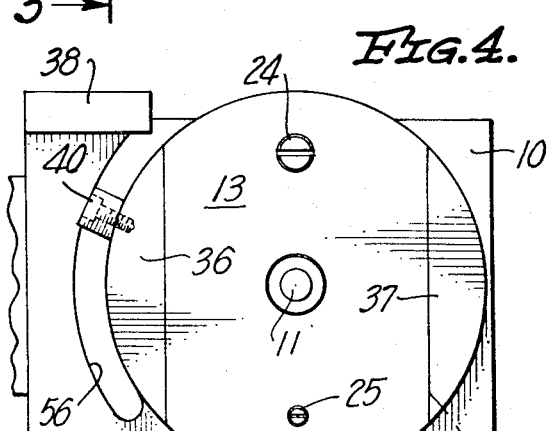
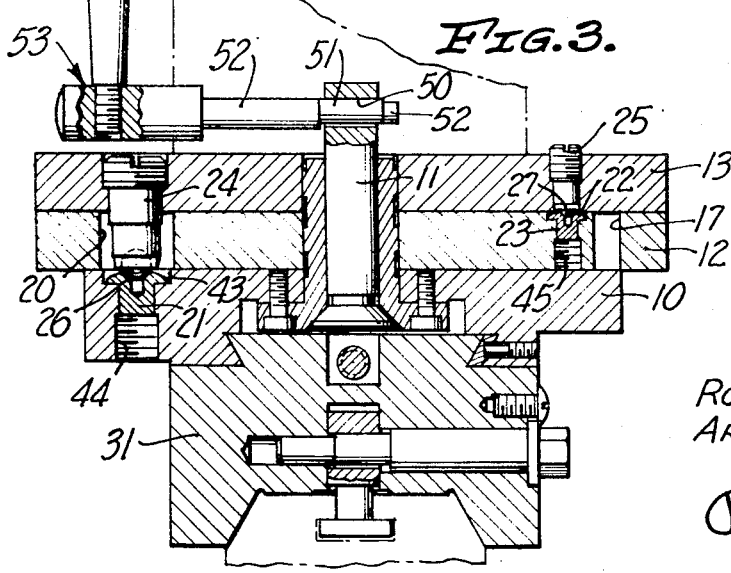
INVENTORS
ROBERT S. LEVIN,
ARTURO A. LA CHIUSA
BY
Robert C. Comstock
ATTORNEY

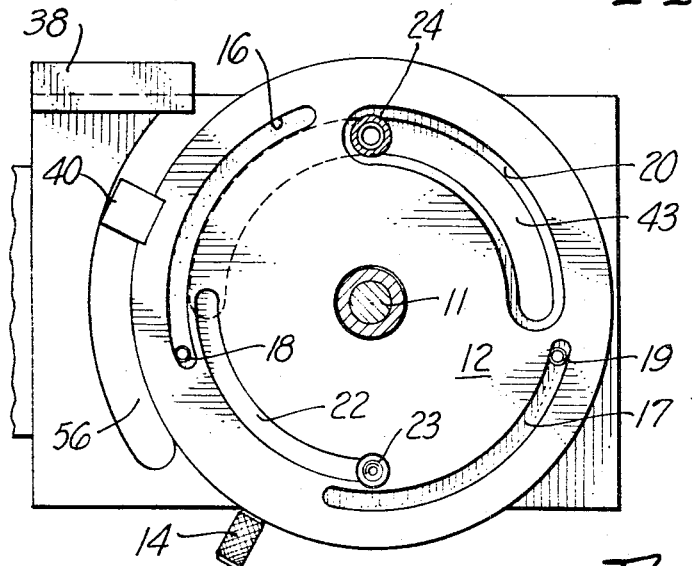
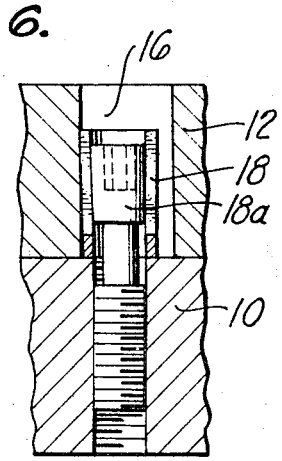
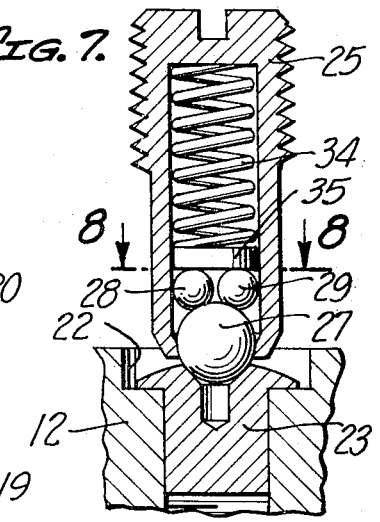
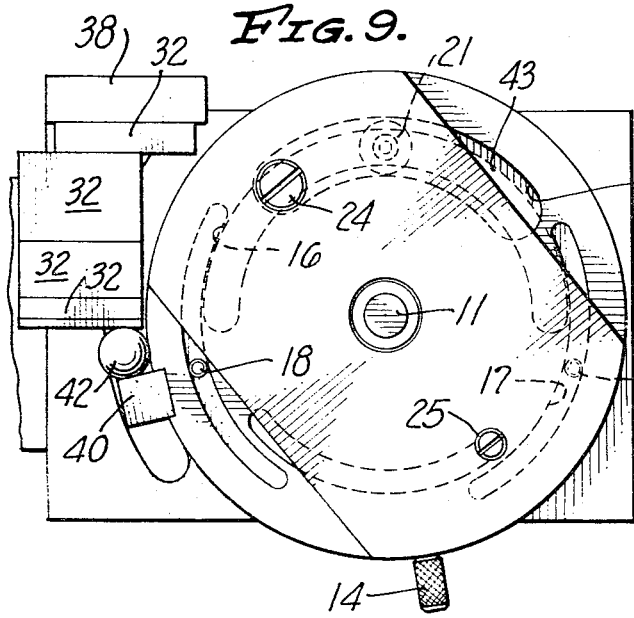
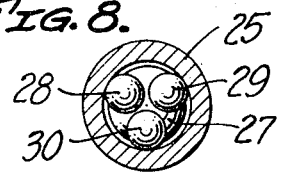

United States Patent Office

3,474,691
Patented Oct. 28, 1969

3,474,691
UNIVERSAL ANGULAR INDEXING TABLE
Robert S. Levin and Arturo A. La Chiusa, Culver City, Calif., assignors to Louis Levin & Son, Inc., Culver City, Calif., a corporation of California
Filed Jan. 29, 1968, Ser. No. 701,375
Int. Cl. B23b *29/24;* B23q *17/00;* B23f *23/08*
U.S. Cl. 74—815           10 Claims

ABSTRACT OF THE DISCLOSURE

A universal table for indexing angles which is adapted for use on machine tools. The device comprises a base, a center plate rotatably mounted above the base and a top plate rotatably mounted above the center plate. The device is mounted on a machine tool and the work holding member of the tool is mounted above the top plate.

The center plate can be rotated with respect to the base to set the device to any desired angle. The center plate is then locked with respect to the base. The top plate is free for rotation with respect to the center plate and base.

The top plate and therefore the work can be indexed back and forth repeatedly between a first or parallel position and an angular position without resetting the angle and with extreme accuracy. A series of successive angles can also be set, each of which is aligned or concentric with the others.

BACKGROUND OF THE INVENTION

Field of the invention

The invention relates to a universal angular indexing table which can be used with various machine tools such as universal grinders, milling machines, lathes, boring machines, drilling machines, lapping machines, etc.

Description of the prior art

The prior art known to the applicants comprises some devices which can be set to any desired angle, but which can not be indexed back forth between both sides of the angle. There are other devices which can be indexed back and forth between both sides of an angle, but they can be set to only a limited number of fixed or pre-set angles and not to any desired angle whatsoever.

SUMMARY OF THE INVENTION

A universal angular indexing table comprising a base, an angle setting member which is movable with respect to the base and a work holding member which is rotatable with respect to the base. The device has means engageable between the work holding member and the base to orient the work holding member to a first position with respect to the base.

The angle setting member is movable with respect to the base to a desired angular position and can be secured against movement with respect to the base after the angular position has been set.

The work holding member is rotatable to the angular position, with means engageable between the work holding member and the angle setting member to orient the work holding member to such angular position. The work holding member can be rotated back and forth between the first position and the angular position.

The principal problem presented in the prior art which has been solved by the present invention is to provide a universal angular indexing table which is capable of being set to any desired angle with extreme precision and accuracy. Once the device has been set to the desired angle, the user of the tool can index back and forth between both sides of the angle without having to re-set the angle and with extreme accuracy in both positions.

Another benefit of the invention is that a plurality of successive angles can be set, each of which is aligned or concentric with the others.

The invention also includes a novel structure for resiliently holding the position locating balls which orient the device in its two positions. The balls are held so that they are free for rotation and for resilient vertical movement while still being held in accurate alignment in all planes transverse to the vertical. Accuracy of positioning of the locating balls is accordingly assured, with corresponding accuracy of placement of the device and work as they are indexed back and forth between the two positions.

It is among the objects of the invention to provide a device having the advantages and benefits set forth above and disclosed hereinafter in this application, and which is relatively simple to operate, while being extremely accurate and precise in its operation.

The invention also comprises such other objects, advantages and capabilities as will later more fully appear and which are inherently possessed by the invention.

While we have shown in the accompanying drawings the preferred embodiment of the invention, it should be understood that the same is susceptible of modification and change without departing from the spirit of the invention.

DESCRIPTION OF THE DRAWING

Referring to the drawings,

FIG. 1 is a perspective view of the indexing table on a reduced scale;

FIG. 2 is a sectional view of the same, taken along line 2—2 of FIG. 1;

FIG. 3 is a sectional view of the same, taken along line 3—3 of FIG. 2;

FIG. 4 is a top plan view taken along line 4—4 of FIG. 2, with the dust covers and their holding knobs omitted, showing in phantom lines how one of the side plates may be slidably removed;

FIG. 5 is top plan view of the device with the dust covers omitted and the top plate removed;

FIG. 6 is an enlarged detailed sectional view of one of the locking collars which locks the center plate to the base;

FIG. 7 is an enlarged detailed sectional view of one of the position locating ball assemblies, with the ball disposed in the socket;

FIG. 8 is a sectional view of the same, taken along line 8—8 of FIG. 7;

FIG. 9 is a top plan view of the device in use with gauge blocks, with the dust covers omitted and the side plates removed.

DESCRIPTION OF THE PREFERRED EMBODIMENT

A preferred embodiment which has been selected to illustrate the invention comprises a substantially rectangular supporting member 31, adapted to be mounted on the head stock or work holding portion of the machine tool with which the device is to be used. Mounted above the supporting member 31 is a base 10. A center post 11 is secured to the base 10 and extends vertically upwardly therefrom. Rotatably mounted on the center post 11 are a center plate 12 and a top plate 13, both of which are circular in shape.

The adjacent surfaces of the base 10 and the plates 12 and 13 extend parallel to and are in engagement with each other. These surfaces are preferably optically flat, so that their engagement is complete and so that no change in elevation occurs as the plates are rotated. The top surface of the top plate 13 should be precisely level for the same reason.

Extending radially outwardly from the periphery of the center plate 12 is a knurled knob 14, which can be grasped to rotate the center plate 12 manually. The knob 14 is preferably removable. A pair of dust covers 15 are removably held by knobs 33 to enclose the end portions of the device.

The center plate 12 is provided adjacent its periphery with a pair of elongated arcuate openings 16 and 17. Extending upwardly from the base 10 are a pair of vertically directed locking collars 18 and 19, which are aligned with and disposed within the openings 16 and 17. Each of the locking collars 18 and 19 is hollow and has its upper portion diametrically split. A pair of bolts 18a and 19a have frusto-conical heads which are disposed within the split portions of the collars 18 and 19. The heads of the bolts 18a and 19a have inwardly directed hexagonal openings for receiving a wrench. The shanks of the bolts 18a and 19a are screw threaded into the base 10.

It will be seen that if the bolts 18a and 19a are tightened, their frusto-conical heads move downwardly and cause the split upper ends of the collars 18 and 19 to expand outwardly into frictional engagement with the adjacent vertical walls of the openings 16 and 17. The locking collars 18 and 19 accordingly lock the center plate 12 against rotation with respect to the base 10.

It should be understood that the locking collars 18 and 19 show only one way of locking the center plate 12 against movement with respect to the base 10 and any other means which accomplishes the same result may be used instead.

The center plate 12 also has an arcuate opening 20 of somewhat greater width than the openings 16 and 17. The base 10 has an upwardly directed arcuate groove 43, which is aligned with the opening 20. A socket 21 is disposed along the groove 43. The socket 21 has a curved top which is disposed slightly upwardly from the upper surface of the base 10 and which surrounds a frusto-conical opening which corresponds precisely with the periphery of a spherical ball.

The center plate 12 is provided with an arcuate groove 22, which is diametrically spaced from the arcuate opening 20. The groove 22 is somewhat narrower than the opening 20. Disposed at one end of the groove 22 is a socket 23, which corresponds to the socket 21, except that it is of somewhat smaller diameter.

The top plate 13 is provided with a pair of diametrically spaced downwardly directed posts 24 and 25. The post 24 is of greater diameter and greater length than the post 25. Both posts 24 and 25 have their upper ends threaded into openings in the top plate 13. Mounted within the lower portions of the posts 24 and 25 and extending downwardly from the open ends thereof are a pair of truly spherical position locating balls 26 and 27 respectively. The post 25 and the related parts of the device are shown in FIG. 7 of the drawings. The post 24 and its related parts are identical except for differences in dimensions.

The ball 27 is held so that it is free to rotate and so that the portion thereof which is disposed within the post 25 simultaneously engages the periphery of three supporting balls 28, 29 and 30, which are resiliently urged downwardly by a coil spring 34 which extends between the top of the post 25 and a spring retainer 35, which engages the top of all three of the smaller balls 28, 29 and 30. The ball 26 is held in the same manner in the post 24.

It will be noted that with this construction, the balls 26 and 27 are free to move in a vertical direction against the urging of the coil springs, without changing their lateral adjustment in the slightest. The balls 26 and 27 extend into the grooves 43 and 22, respectively. The ball 26 travels along the groove 43 when the top plate 13 is rotated with respect to the base 10. The ball 27 travels along the groove 22 when the top plate 13 is rotated with respect to the center plate 12.

The top plate 13 has a pair of removable end plates 36 and 37, which overlie the openings 16 and 17 and which can be slidably removed as indicated in FIG. 4 of the drawings to provide access to the locking collars 18 and 19.

The base 10 is provided adjacent one corner thereof with a substantially rectangular block 38, which has a flat side surface. The center plate 12 has a substantially square block 40 which extends radially outwardly from its periphery on the said side as the block 38. The block 40 has a flat side surface which is directed toward the side surface of the block 38.

The top plate 13 may be provided with a plurality of countersunk openings. Fastening members may be mounted with their heads disposed in the openings and their threaded shanks extending vertically upwardly to engage the work holding member to secure it to the top plate 13.

The center post 11 is provided with a transverse cylindrical opening 50, through which the eccentric portion 51 of the shank 52 of a key 53 extends. The portions of the shank 52 on opposite sides of the eccentric portion 51 are rotatably journaled in cylindrical openings formed in the work holder. An arm 54 extends transversely from the opposite end of the key 53. When the arm 54 is rotated, upward pressure is exerted on the center post 11, which is secured to the base 10, causing the base 10, center plate 12 and top plate 13 to be forced upwardly into tight engagement with each other and with the work holding member of the machine tool. This structure is shown in FIG. 3 of the drawings, with the work holding member being shown in phantom lines. This assures that the plates are held together so that no changes in elevation will occur in use.

In use, the dust covers 15 must be removed to provide access to the end plates 36 and 37, which are also removed. A wrench may then be used to loosen the bolts 18a and 19a so that the locking collars 18 and 19 no longer engage the adjacent vertical walls of the arcuate openings 16 and 17. This releases the center plate 12 for rotation with respect to the base 10.

A circular ball 42 of ½" diameter is then placed between the side surface of the rectangular block 38 and the side surface of the square block 40 and the adjacent portion of the periphery of the center plate 12. An arcuate groove 56, the bottom of which is slanted toward the center plate 12, holds the ball 42 in position. One or more gauge blocks 32 are also placed between the rectangular block 38 and the square block 40, along with the ball 42. The number and thickness of gauge blocks 32 used is whatever is required to set the device to the particular angle desired. Charts are available which provide the proper information regarding the desired thickness of gauge blocks to be used for any desired angle.

The ball 42 assures accuracy between the blocks 38 and 40 and the gauge blocks 32, regardless of the particular angle at which the square block 40 may be oriented, due to rotation of the center plate 12.

After the center plate 12 has been rotated to bring the block 40 into tight engagement with the ball 42 and the gauge blocks 32, the locking collars 18 and 19 are tightened, to lock the center plate 12 against further rotation with respect to the base 10. The end plates 36 and 37 and the dust covers 15 are then replaced. The top plate 13 is still free to rotate with respect to the center plate 12 and base 10.

It will be noted that the larger socket 21 is carried by the base and is thus stationary. When the larger ball 26 is disposed within the socket 21, the work holding member of the tool is held in its first or parallel position.

When the user desires to change the tool to the second or angular position which has been set by rotation of the center plate 12, he merely rotates the work holding member of the tool and the top plate 13 to which the work holding member has been secured. As the top plate 13 rotates, the larger ball 26 moves out of the socket 21 and travels along the groove 43 and the post 24 moves through the arcuate opening 20.

The smaller ball 27 simultaneously travels along the arcuate groove 22 until it reaches and moves into the smaller socket 23. The resilient mounting of the ball 27 permits it to move slightly upwardly over the top of the socket 23 and then drop down into the socket with an action which can be determined by a clicking sound or by feeling. When the small ball 27 is disposed within the socket 23, the work holding member is oriented to the desired angular position.

When the user desires to return the work holding member to its parallel position, he rotates the work holding member and top plate 13 until the larger ball 26 rolls back into its socket 21. This movement can also be determined by a clicking sound or by feeling.

It is accordingly possible for the user to index the work holding member back and forth between its parallel and angular positions and thus between both sides of any angle with ease and absolute accuracy. The angle need not be re-set, and both the angular and parallel positions are held with extreme accuracy. With the use of gauge blocks, the device can be set to any desired angle within several seconds of accuracy. The angle can be repeated with an accuracy of five minutes of arc.

If a series of successive angles is required, each angle will be properly aligned or concentric with the others and any number of angles can be set without removing the work or the work holding member. On a cylindrical part, for exampe, several different angles can be successively cut on the piece, with each angle being dead concentric with the others.

The accuracy of the device necessarily depends upon the engagement between the plates, so that no change of elevation occurs as the plates are rotated upon the accuracy of the engaging balls and sockets. The sockets should be precisely complementary to the balls and the above described mounting of the balls prevents their moving out of alignment.

The device as shown is capable of indexing over a range somewhat in excess of 45 degrees, but a range of 45 degrees will provide sufficient movement to set any desired angle.

The end plates 36 and 37 are preferably made very slightly thinner than the center portion of the top plate 13 to avoid undesirable frictional engagement between the end plates 36 and 37 and the center plate as the end plates are slidably removed and inserted.

The sockets 21 and 23 are vertically adjustable by means of a set screw (not shown in the drawings) which is inserted into threaded recesses 44 and 45 directly beneath the sockets. The lower portion of the set screw engages the screw threaded walls of the recess and the upper end engages the socket and moves it upwardly. The sockets are held by press fit frictional engagement and will accordingly remain in the position to which they are moved. The sockets may also be held by screw threading, if desired.

The work is held for movement in a direction to the right from FIG. 5 of the drawings. A line drawn perpendicular to a line extending through the center post 11 and the larger socket 21 accordingly indicates the parallel position of the device. A line drawn perpendicular to a line extending through the center post 11 and the smaller socket 23 indicates the angular position of the table. The acute angle between these two lines is the angle through which the table is moved as it is indexed back and forth between its parallel and angular positions.

The periphery of the center plate 12 may be provided with index markings as shown in FIG. 1 of the drawings to indicate visually the angle to which the center plate 12 is set.

We claim:

1. An angular indexing table comprising a base, an angle setting member movable with respect to said base, and a work holding member rotatable with respect to said base, means engageable between said work holding member and said base to orient said work holding member to a first position with respect to said base, said angle setting member being movable to a desired position angular to said first position, means for securing said angle setting member against movement with respect to said base after said angular position has been set, said work holding member being rotatable to said angular position, and means engageable between said work holding member and said angle setting member to orient said work holding member to said angular position, said work holding member being rotatable back and forth between said first position and said angular position.

2. The structure described in claim 1, said angle setting member being rotatable with respect to said base, to set said desired angle.

3. The structure described in claim 2, said angle setting member comprising a circular plate rotatably mounted above said base, and said work holding member comprising a top plate rotatably mounted above said center plate.

4. The structure described in claim 3, said base and said plates having flat parallel engaging surfaces.

5. The structure described in claim 4, said center plate having an arcuate opening, and means extending between said top plate and said base through said opening to orient said top plate to said first position.

6. The structure described in claim 5, said center plate having an arcuate groove, means extending downwardly from said top plate into said groove and engageable with said center plate to orient said top plate to said angular position.

7. The structure described in claim 6, said means extending downwardly from said top plate through said opening comprising a ball, said base having a socket aligned with said opening, said ball being movable into said socket upon the rotation of said top plate with respect to said base to orient said top plate to said first position.

8. The structure described in claim 7, said means extending downwardly from said top plate into said groove comprising a ball, said center plate having a socket disposed along said groove, said ball being movable into said socket upon the rotation of said top plate with respect to said center plate to orient said top plate to said angular position.

9. The structure described in claim 8, each of said balls being rotatably and resiliently mounted with respect to said top plate.

10. The structure described in claim 9, and three balls mounted above each of said balls, and resilient means urging said three balls into simultaneous engagement with each of said socket engaging balls to maintain said socket engaging balls in alignment.

References Cited

UNITED STATES PATENTS

| | | | |
|---|---|---|---|
| 2,832,242 | 4/1958 | Van Vooren | 77—64 |
| 3,218,890 | 11/1965 | Cafolla | 74—815 |
| 3,277,789 | 10/1966 | Graham | 90—56 |

ANDREW R. JUHASZ, Primary Examiner

GIL WEIDENFELD, Assistant Examiner

U.S. Cl. X.R.

77—64; 90—56